(12) United States Patent
Jiang et al.

(10) Patent No.: US 12,272,043 B2
(45) Date of Patent: *Apr. 8, 2025

(54) SEMICONDUCTOR TOPOGRAPHY SIMULATION OF NON-REMOVAL TYPE PROCESSES

(71) Applicant: Taiwan Semiconductor Manufacturing Company, Ltd., Hsinchu (TW)

(72) Inventors: Zhengping Jiang, Hsinchu (TW); Nuo Xu, San Jose, CA (US); Ji-Ting Li, Hsinchu (TW); Yuan Hao Chang, Hsinchu (TW); Zhiqiang Wu, Hsinchu County (TW); Wen-Hsing Hsieh, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 141 days.

This patent is subject to a terminal disclaimer.

(21) Appl. No.: 17/832,586

(22) Filed: Jun. 4, 2022

(65) Prior Publication Data
US 2023/0394642 A1  Dec. 7, 2023

(51) Int. Cl.
*G06T 7/00* (2017.01)
*G06T 15/08* (2011.01)

(52) U.S. Cl.
CPC ............ *G06T 7/0004* (2013.01); *G06T 15/08* (2013.01); *G06T 2207/10028* (2013.01)

(58) Field of Classification Search
CPC ................. G06T 7/0004; G06T 15/08; G06T 2207/10028
See application file for complete search history.

(56) References Cited

U.S. PATENT DOCUMENTS

| 7,557,807 B2 * | 7/2009 | Chen ....................... G06F 30/20 345/473 |
| 10,599,789 B2 | 3/2020 | Regli et al. |
| 11,030,356 B2 | 6/2021 | Marshall et al. |

(Continued)

FOREIGN PATENT DOCUMENTS

CN   113451303 A   9/2021

OTHER PUBLICATIONS

Xaver Klemenschits et al., Modeling of Gate Stack Patterning for Advanced Technology Notes: A Review, MDPI, Nov. 29, 2018, 31 pages.

(Continued)

*Primary Examiner* — Samantha (Yuehan) Wang

(74) *Attorney, Agent, or Firm* — HAYNES AND BOONE, LLP

(57) ABSTRACT

The present disclosure provides a method for topography simulation of a physical structure under a topography-changing process. The method includes initializing a voxel mesh as a three-dimensional (3D) representation of the physical structure, generating a batch of particles, simulating a flight path of at least one of the particles with a ray-tracing method, identifying a voxel unit in the voxel mesh that intersects the flight path, determining a surface reaction between the one of the particles and the voxel unit, and adding an extra voxel unit adjacent to the voxel unit based on the determining of the surface reaction.

20 Claims, 8 Drawing Sheets

(56) References Cited

U.S. PATENT DOCUMENTS

| | | | |
|---|---|---|---|
| 2009/0167763 A1* | 7/2009 | Waechter | G06T 15/40 |
| | | | 345/426 |
| 2017/0147724 A1* | 5/2017 | Regli | H01L 21/027 |
| 2021/0110089 A1 | 4/2021 | Chen et al. | |
| 2021/0304489 A1* | 9/2021 | Saeed | G06T 15/06 |
| 2022/0237872 A1* | 7/2022 | Meilland | G06T 17/20 |
| 2023/0394641 A1* | 12/2023 | Xu | G06T 7/0004 |

OTHER PUBLICATIONS

Jia-Chen Yu et al., Three-Dimensional Simulation of DRIE Prcoess Based on the Narrow Band Level Set and Monte Carlo Method, MDPI, Feb. 9, 2018, 12 pages.

Jun-Gu Lee et al., Fast and Accurate Simulation for Topography in Nanometer Semiconductor Process, Extended Abstracts of the 2005 International Conference on Solid State Devices and Materials, Kobe, 2005, pp. 838-839.

Jun-Gu Lee et al., Topography Simulation for Structure Analysis Using Cell Advancing Method, NSTI-Nanotech 2005, www.nsti.org, ISBN 0-9767985-2-2, vol. 3, 2005 pp. 91-94.

* cited by examiner

SEMICONDUCTOR TOPOGRAPHY SIMULATION OF NON-REMOVAL TYPE PROCESSES

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs and, for these advancements to be realized, similar developments in IC processing and manufacturing are needed.

As a part of the semiconductor fabrication, fast and accurate understanding of topographical evolution of device surfaces during semiconductor manufacturing processes is important for IC designers to optimize the manufacturing flow in nanometer semiconductor process. Many research efforts have been made on the software and hardware development of suitable electronic design automation (EDA) environment for semiconductor topography simulations. Conventional EDA tools and algorithms for semiconductor topography simulations is computationally inefficient. For example, existing topography simulations often rely on step-by-step particle flight simulation and the trial-error process to find converged solutions in simulating topography-changing removal type processes (e.g., etching process) and topography-changing non-removal type processes (e.g., deposition process or oxidation process), which is extremely time consuming for large-scale problems. Therefore, while existing EDA tools and algorithms have generally been adequate for their intended purposes, they have not been entirely satisfactory in every aspect.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
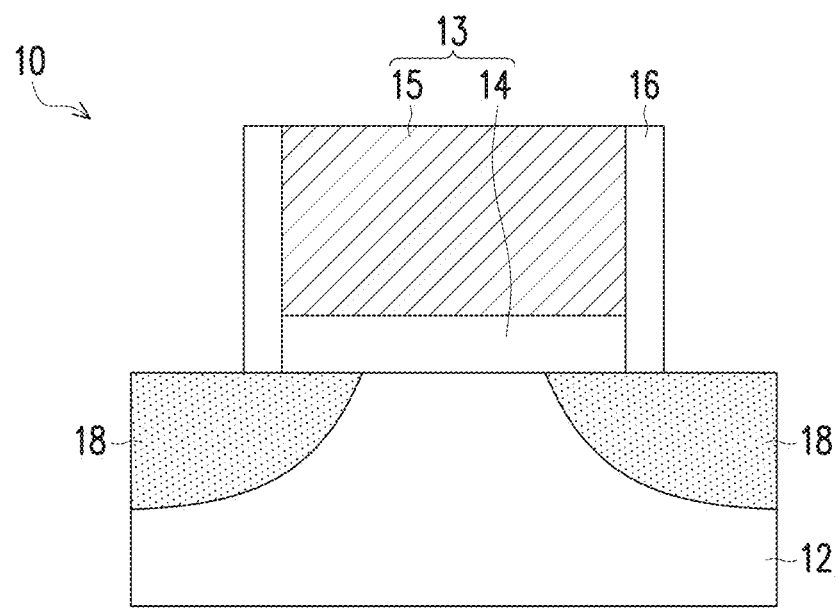
FIGS. 1A, 1B, 1C, and 1D illustrate cross-sectional views of a semiconductor device under multiple topography-changing non-removal type processes, in accordance with some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "over," "below," "beneath," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features. Still further, when a number or a range of numbers is described with "about," "approximate," and the like, the term is intended to encompass numbers that are within +/−10% of the number described, unless otherwise specified. For example, the term "about 5 nm" encompasses the dimension range from 4.5 nm to 5.5 nm.

An integrated circuit (IC) is a set of electronic circuits on one small flat piece (or "chip") of semiconductor material, usually silicon. Large numbers of tiny field-effect transistors (FETs) are integrated into a small chip. This results in circuits that are orders of magnitude smaller, faster, and less expensive than those constructed of discrete electronic components. The IC's mass production capability, reliability, and building-block approach to integrated circuit design has ensured the rapid adoption of standardized ICs in place of designs using discrete transistors. ICs are now used in virtually all electronic equipment and have revolutionized the world of electronics. Computers, mobile phones, and other digital home appliances are now inextricable parts of the structure of modern societies, made possible by the small size and low cost of ICs such as modern computer processors and microcontrollers.

Most of today's production processes of making reliable IC structures are conducted in carefully calibrated reactor setups and are sensitive to variations of processing parameters. Optimizing a production process or developing a new sequence of processes has become a very expensive endeavor. Thus, computational simulations are more and more used to partly replace expensive and lengthy experimental process runs. In all areas of semiconductor product development, computational simulations have become an integral part and are also key to gain additional insights into the IC production processes.

An important branch of computational simulation-based electronic design automation (EDA) is technology computer-aided design (TCAD) which models the fabrication and the operation of semiconductor devices and circuits. The modeling of the fabrication is called Process TCAD (P-TCAD) and includes simulations of processing steps such as etching, deposition, diffusion, and implantation. The simulated device structures are forwarded to Device TCAD (D-TCAD) to determining electrical characteristics, which in turn are used by Circuit TCAD (C-TCAD) to simulate the behavior of IC circuits containing multiple FETs and interconnections.

The present disclosure is generally related to a feasible TCAD solution, and more particularly to a P-TCAD providing fast and accurate EDA environment and high-performance computing (HPC) solutions for semiconductor topography simulations of non-removal type processes. Embodiments of the present disclosure substantially speedup the semiconductor topography simulations by a factor of 10 times to 1000 times without sacrificing accuracy.

Some embodiments of the present disclosure illustrate hardware and methods of semiconductor topography simulations of topography-changing processes applied in semiconductor manufacturing flow (e.g., etching and/or deposition on a physical structure, such as a silicon wafer). Topography-changing processes include removal type processes and non-removal type processes. Generally, topography-changing removal type processes include wet etch, gas-wet-mixed-fluid etch, oxide etch, poly silicon etch, metal etch, SiC etch, SiN etch, sputter etch, plasma etch, atomic layer etch (ALE), polyimide exposure, photoresist (PR) exposure, EUV PR exposure, PR remove, wafer bevel removal, wafer edge removal, Si recess, through Si via etch, through molding etch, and other suitable processes. On the other hand, topography-changing non-removal type processes include CVD, PVD, ALD, anneal, BARC coating, TARC coating, Polyimide coating, PR coating, EUV PR coating, wet clean, gas clean, gas-wet-mixed-fluid clean, thermal diffusion, wet diffusion, implant diffusion, solid diffusion, work-function material deposition, thermal treatment, cooling treatment, stress treatment, epitaxy process, etch stop layer deposition, ELK deposition, and other suitable processes.

Etching and deposition are key topography-changing processes in a semiconductor manufacturing flow. To simulate particle flights in etching and/or deposition processes, existing semiconductor topography simulations are mainly based on finite-difference time domain (FDTD) numerical schemes and only support step-by-step, sequential events, which are extreme time consuming and often fail to simulate large number of particles in realistic process and device simulations. In design cycles, prolong topography simulations may delay the time-to-market for a new product, which may cost millions of dollars in lost revenue. Further, existing semiconductor topography simulations are mainly based on finite element method (FEM) mesh with level-set algorithms to simulate semiconductor surface movement, which may generally lose accuracy when handling small feature scales and cannot capture stochastic effects. As most of today's semiconductor manufacturing processes are conducted in meticulously calibrated reactors and sensitive to setups and process parameters, losing accuracy in topography simulations may lead to expensive and lengthy experimental process runs. As a comparison, embodiments of the present disclosure use voxel mesh model to simulate semiconductor surface movement and ray-tracing algorithms to simulate particle flights based on novel computing system platforms that combining computational power of central processing unit (CPU)-based central processing units and parallelization provided by hardware accelerator-based processing units.

Reference is now made to FIGS. 1A-1D. FIGS. 1A-1D illustrate some exemplary processes during IC manufacturing. These exemplary processes are for illustrative purposes only and are not intended to limit the embodiments to the forms disclosed. Particularly, FIGS. 1A-1D illustrate the step of forming a gate structure in an FET device. The gate structure formation alone may require multiple non-removal type processes, including deposition and oxidation. Non-removal type processes are important steps in the fabrication of semiconductor devices. The purpose of non-removal type processes is to realize a three-dimensional (3D) structure consisting of different materials by a sequence of steps that add material to semiconductor device surfaces. Physics-based topography simulations model these processes and assist engineers to understand, control, and optimize the processes.

As shown in FIG. 1A, in an exemplary manufacturing flow to fabricate an FET device 10 (or referred to as device 10), a dummy gate structure 13 are formed on a substrate 12. The substrate 12 is a silicon substrate in the present embodiment. Alternatively, the substrate 12 may comprise another elementary semiconductor, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. In yet another alternative, the substrate 12 is a semiconductor on insulator (SOI). In some embodiments, the substrate 12 includes an insulator (or an isolation structure) that may be formed of silicon oxide, silicon nitride, silicon oxynitride, fluoride-doped silicate glass (FSG), a low-k dielectric material, and/or other suitable insulating material. The insulator may be shallow trench isolation (STI) features. In an embodiment, the insulator is formed by etching trenches in the substrate 12, filling the trenches with an insulating material, and performing a chemical mechanical planarization (CMP) process to the substrate 12 including the insulating material. The substrate 12 may include other isolation structure(s) such as field oxide and LOCal Oxidation of Silicon (LOCOS). The substrate 12 may include a multi-layer isolation structure.

The dummy gate structure 13 includes a dummy gate dielectric layer 14 and a dummy gate electrode 15. The dummy gate dielectric layer 14 and the dummy gate electrode 15 are both formed by non-removal type processes. In some embodiments, the dummy gate dielectric layer 14 includes silicon oxide and is formed by oxidizing a surface portion of the substrate 12 in a thermal oxidation process. In one example, the thermal oxidation process comprises applying $H_2O$ gas at a temperature between about 500° C. to about 1000° C. to a surface of the substrate 12. In some embodiments, the dummy gate electrode 15 includes polysilicon and is deposited by a suitable layer deposition technique, such as CVD (including both low-pressure CVD and plasma-enhanced CVD), PVD, ALD, or other suitable deposition techniques, or combinations thereof.

The gate spacers 16 may include a dielectric material such as silicon oxide, silicon nitride, silicon carbide, silicon oxynitride, SiCN, silicon oxycarbide, SiOCN, a low-k material, and/or combinations thereof. In some embodiments, the gate spacers 16 include multiple layers, such as a liner spacer layer and a main spacer layer, and the like. By way of example, the gate spacers 16 may be formed by conformally depositing a dielectric material over the device 10 using processes such as a CVD process, a subatmospheric CVD (SACVD) process, a flowable CVD process, an ALD process, a PVD process, or other suitable process. Following the conformal deposition of the dielectric material, portions of the dielectric material used to form the gate spacers 16 may be etched-back. In some cases, the etch-back process removes portions of dielectric material of the gate spacer 16 from a top surface of the dummy gate structure 13. In some embodiments, the etch-back process may include a wet etch process, a dry etch process, a multiple-step etch process, and/or a combination thereof. After the etch-back process, the gate spacers 16 remain disposed on sidewalls of the dummy gate structure 18.

The source/drain (S/D) regions 18 are also formed in the substrate 12. The S/D regions 18 may be n-type doped regions and/or p-type doped regions for forming active devices. The S/D regions 18 may include heavily doped S/D (HDD), lightly doped S/D (LDD), raised regions, strained regions, epitaxially grown regions, and/or other suitable features. The S/D regions 18 may be formed by etching and epitaxial growth, S/D implantation, S/D activation, and/or other suitable processes. In an embodiment, the S/D regions 18 further include silicidation or germanosilicidation.

Figure 1B:
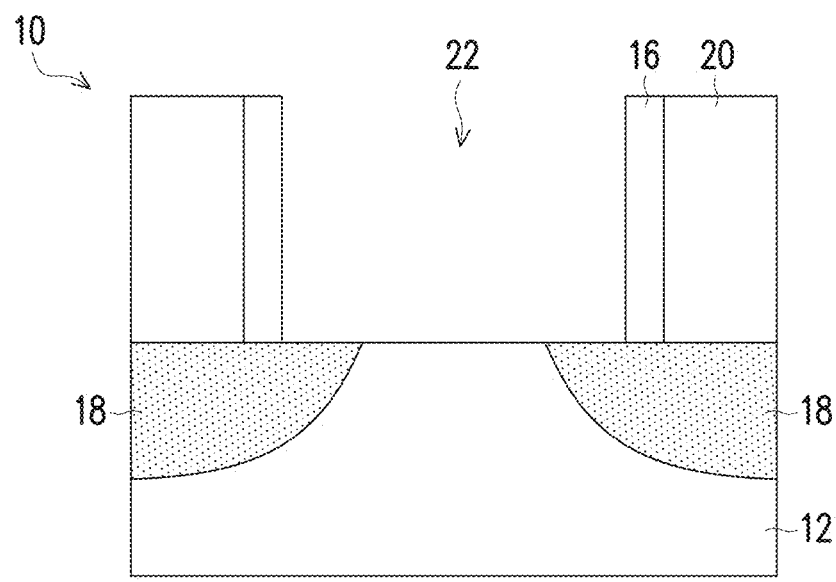

As shown in FIG. 1B, an inter-layer dielectric (ILD) layer 20 is formed over the device 10 by a deposition process. The ILD layer 20 may include materials such as or silicon oxide, doped silicon oxide such as borophosphosilicate glass (BPSG), tetraethylorthosilicate (TEOS) oxide, un-doped silicate glass, fused silica glass (FSG), phosphosilicate glass (PSG), boron doped silicon glass (BSG), low-k dielectric material, and/or other suitable dielectric materials. The ILD layer 20 may be deposited by a PECVD process, a flowable CVD (FCVD) process, or other suitable deposition technique.

Also as shown in FIG. 1B, the dummy gate structure 13 is subsequently removed in a removal type process to form a gate trench 22. The removal type process may include one or more etching processes that are selective to the material in the dummy gate structure 13. For example, the removal of the dummy gate structure 13 may be performed using a selective etch process such as a selective wet etch, a selective dry etch, or a combination thereof.

Figure 1C:
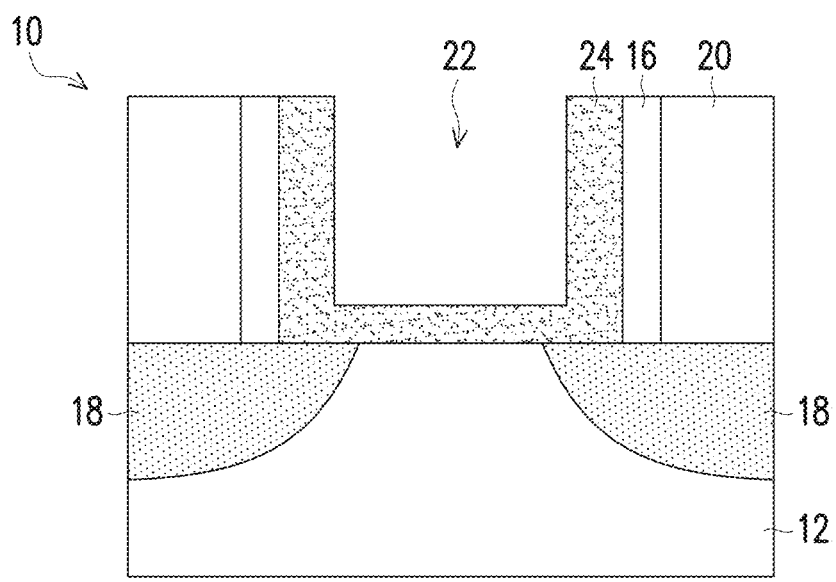

As shown in FIG. 1C, a gate dielectric layer 24 is deposited in the gate trench 22 with a non-removal type process. In some embodiments, the gate dielectric layer 24 includes a high-k dielectric layer and an interfacial layer interposed between the substrate 12 and the high-k dielectric layer. In various embodiments, the interfacial layer may include a dielectric material such as silicon oxide or silicon oxynitride, and may be formed by chemical oxidation, thermal oxidation, atomic layer deposition (ALD), chemical vapor deposition (CVD), and/or other suitable methods. The high-k dielectric layer is formed by a suitable process such as an atomic layer deposition (ALD). Other methods to form the high-k dielectric layer include metal organic chemical vapor deposition (MOCVD), physical vapor deposition (PVD), UV-Ozone Oxidation and molecular beam epitaxy (MBE). In one embodiment, the high-k dielectric material includes hafnium oxide ($HfO_2$), zirconium oxide ($ZrO_2$), lanthanum oxide ($La_2O_3$), titanium oxide ($TiO_2$), yttrium oxide ($Y_2O_3$), strontium titanate ($SrTiO_3$), other suitable metal-oxides, or combinations thereof.

Figure 1D:
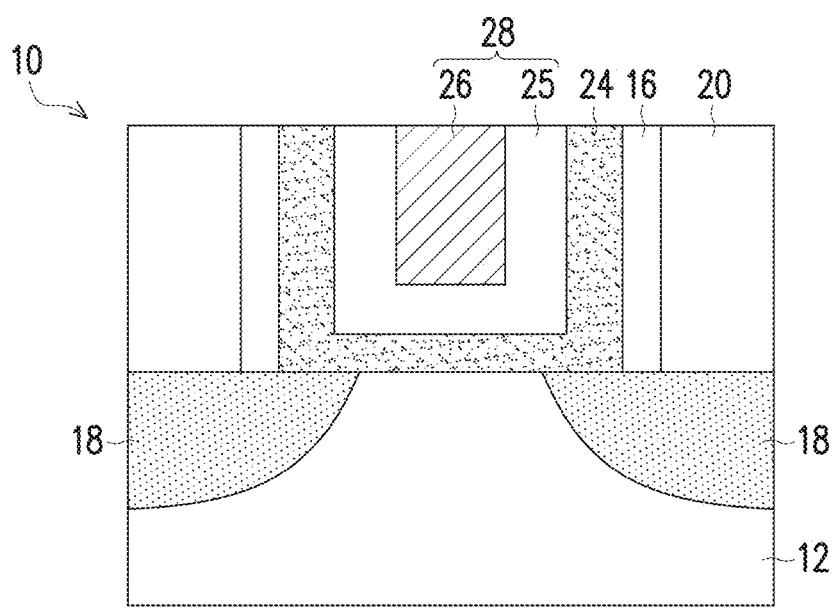

As shown in FIG. 1D, the gate electrode layer 28 is deposited above the gate dielectric layer 24. In some embodiments, the gate electrode layer 28 is a metal gate electrode layer. The metal gate electrode layer may further include multiple layers, such as a work function metal layer 25 and a metal fill layer 26. The work function metal layer 25 may include a p-type work function metal layer or an n-type work function metal layer. The p-type work function metal layer comprises a metal selected from, but not limited to, the group of titanium nitride (TiN), tantalum nitride (TaN), ruthenium (Ru), molybdenum (Mo), tungsten (W), platinum (Pt), or combinations thereof. The n-type work function metal layer comprises a metal selected from, but not limited to, the group of titanium (Ti), aluminum (Al), tantalum carbide (TaC), tantalum carbonitride (TaCN), tantalum silicon nitride (TaSiN), or combinations thereof. The work function metal layer 25 may be formed by ALD, CVD, PVD, plating, and/or other suitable processes. The metal fill layer 26 may include aluminum (Al), tungsten (W), or copper (Cu) and/or other suitable materials. The metal fill layer 26 may be formed by CVD, PVD, plating, and/or other suitable processes. After deposition of the gate electrode layer 28, a planarization process, such as a chemical mechanical polishing (CMP) process is performed to remove excess material portions and to planarize a top surface of the device 10.

As illustrated in FIGS. 1A-1D, gate structure formation alone may require multiple non-removal type processes, such as deposition and oxidation. Fast and accurate semiconductor topography simulations of non-removal type processes are quite important. For example, if a 3D geometry in FIGS. 1A-1D cannot be approximated as constant in one dimension, the influence of the surrounding geometry on the deposition rates (caused by shadowing of parts of the surface) of a deposition process should be considered. A 3D simulation increases the computational demands. This is noticeable especially when considering the simulation times for deposition process. The accurate calculation of the deposition rates on a highly resolved surface may become a bottleneck, accounting for the majority of the total runtime of the overall simulation. In turn, therein lies a fundamentally important demand for computationally efficient, high performance numerical methods for the surface topography simulations.

Figure 2:
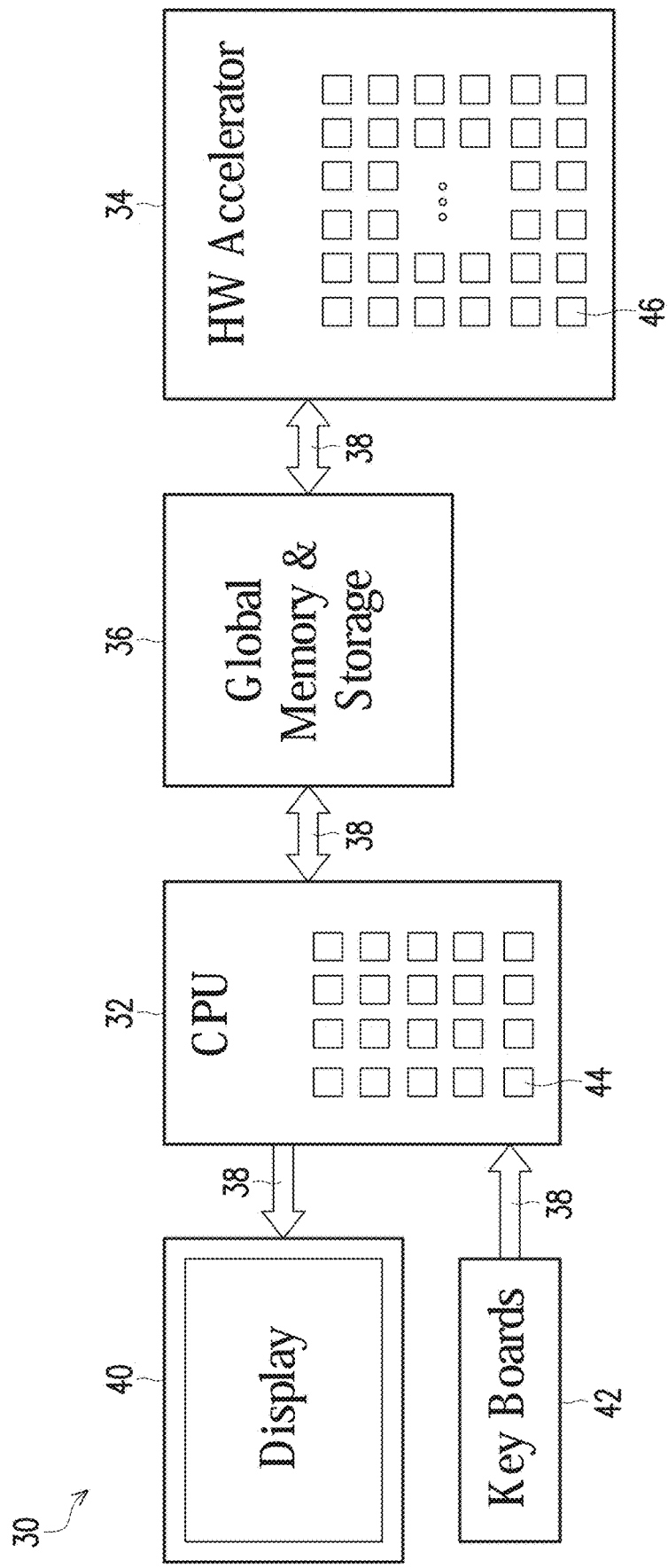
FIG. 2 illustrates an exemplary topography simulation system, in accordance with some embodiments of the present disclosure.

FIG. 2 illustrates a topography simulation system in accordance with some embodiments described herein. The term "topography simulation system" generally refers to a hardware-based system that is used in topography simulations of design and manufacturing processes. Particularly, in context of IC design and manufacturing, a topography simulation system facilitates the IC design so that ICs can be subsequently manufactured at a semiconductor fabrication facility. Topography simulation system 30 can include general purpose CPU (GP-CPU) 32, hardware (HW) accelerator 34, global memory and storage 36, input/output (I/O) terminals 38, display device 40, keyboard 42, and other peripheral devices. The CPU 32 is in charge of controlling the I/O, simulation, and internal data transfer flows in the topography simulation. The HW accelerator 34 is in charge of parallel processing threads. The CPU 32 can be a single processing chip that provides multiple processing cores 44. Alternatively, the CPU 32 can be a cluster of separate processing chips that provide multiple processing cores 44. The cluster of processing chips access a shared memory (not shown) in the CPU 32. Similarly, the HW accelerator 34 can be a single HW accelerator chip that provides multiple processing cores 46. Alternatively, the HW accelerator 34 can be a cluster of separate HW accelerator chips that provide multiple processing cores 46. The CPU 32 and the HW accelerator 34 are both coupled to the global memory and storage 36. Specifically, memory locations in the global memory and storage 36 can be accessed by the processing cores 44 in the CPU 32 and the processing cores 46 in the HW accelerator 34, thereby enabling CPU 32 to dispatch instructions to the HW accelerator 34 and enabling the HW accelerator units 34 to manipulate the data (e.g., surface movement) stored in the global memory. The storage can store operating system, simulation tool, and data. Data can include input required by simulation tool and/or output generated by simulation tool. The topography simulation system 30 may automatically (or with user help) perform one or more operations that are implicitly or explicitly described in this disclosure. Specifically, the topography simulation system 30 can load topography simulation tool into memory, and simulation tool can then be used to perform topography simulation of removal type and/or non-removal type processes on a physical structure. Next, simulation tool (or another tool that is stored in storage) can be used to determine whether or not an IC chip will be manufactured with the desired features and performance characteristics. If the IC chip is expected to be manufactured as desired, the overall IC design and manufacturing process can proceed to the next step. Otherwise, the overall IC design and manufacturing process can return to a previous step in which the IC design or the semiconductor manufacturing process can be modified.

In the topography simulation system 30, CPU 32 and HW accelerator 34 are fundamental computing engines. The term "hardware (HW) accelerator" refers to specialized hardware components other than general purpose CPU, particularly specialized hardware components within the system configured to offload certain computing tasks, enabling greater efficiency than is possible in software running on a general-purpose CPU alone. HW accelerators may include graphics processing unit (GPU), tensor processing unit (TPU), field-programmable gate array (FPGA), application specific integrated circuit (ASIC), digital signal processor (DSP), and/or artificial intelligence (AI)-accelerator cards. In some embodiments, the hardware accelerator in the topography simulation system 30 is a cluster of GPUs.

CPUs and GPUs each have unique strengths that will allow them to play an integral role in meeting the computing needs. CPUs and GPUs have a lot in common. Both are critical computing engines. Both are silicon-based microprocessors. And both handle data. But CPUs and GPUs have different architectures and are built for different purposes. The CPU is suited to a wide variety of workloads, especially those for which latency or per-core performance are important. As a powerful execution engine, the CPU focuses its smaller number of cores on individual tasks and on getting things done quickly. This makes it uniquely well equipped for jobs ranging from serial computing to running databases. GPUs began as specialized ASICs developed to accelerate specific 3D rendering tasks. Over time, these fixed-function engines became more programmable and more flexible. GPUs have evolved to become more competent in handling massive parallelism workload. For example, in the topography simulation system 30, CPU 32 may provide up to 64 parallel processing threads, while HW accelerator 34 adopting Nvidia A100 GPU may provide about 50 thousand parallel processing threads.

Figure 3:
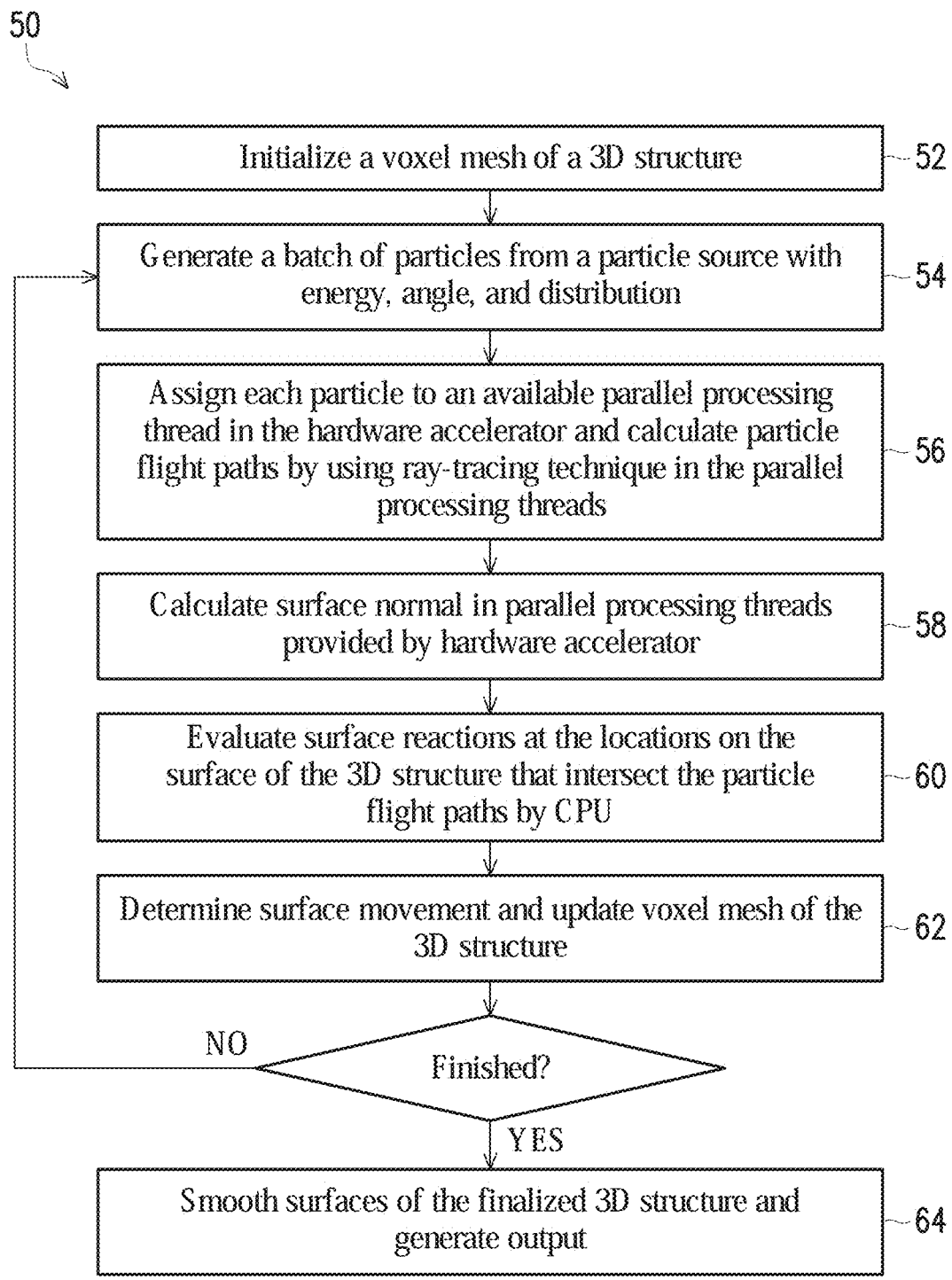
FIG. 3 illustrates a flow chart of a semiconductor topography simulation process, in accordance with some embodiments of the present disclosure.

Illustrated in FIG. 3 is a method 50 of semiconductor topography simulation. The method 50 is merely an example, and is not intended to limit the present disclosure beyond what is explicitly recited in the claims. Additional operations can be provided before, during, and after the method 50, and some operations described can be replaced, eliminated, or moved around for additional embodiments of the method.

The method 50 at operation 52 (FIG. 3) initializes a voxel mesh as a representation of a 3D structure of the semiconductor device. That is, the structural information of the semiconductor device is represented in a 3D voxel grid (cellular grid). The 3D structure of the semiconductor device may be from a pre-stored database (i.e., a starting point for simulation, such as an initial wafer) or as a resultant structure from a previous topography simulation (e.g., as in FIGS. 1A-1F, the intermittent structure for ET3 being a resultant structure from previous ET2). Each voxel unit in the voxel mesh defines a point in 3D space, as the minimum resolution of the structure. Such voxel mesh allows structural modifications in a fast and robust way.

Figure 4:
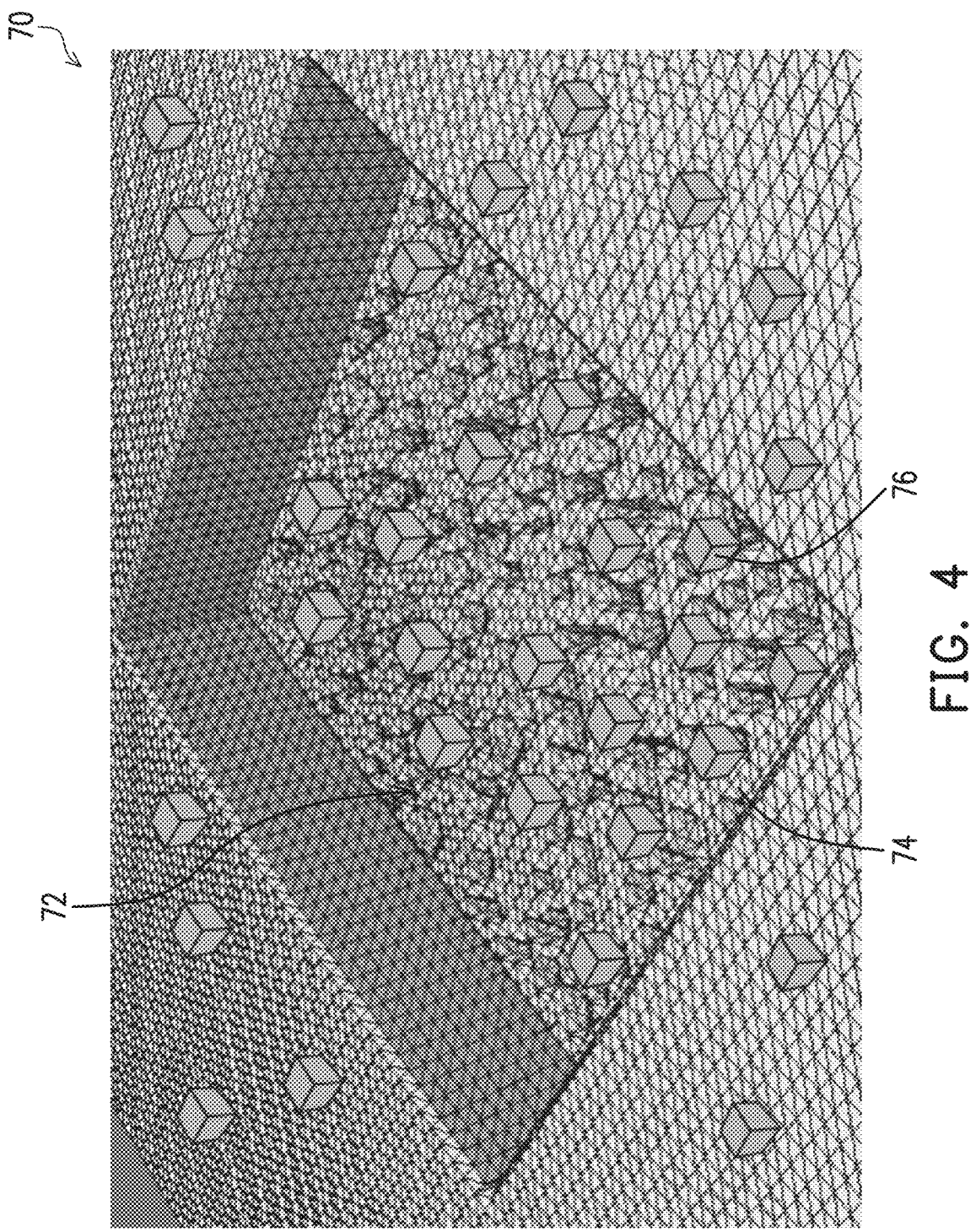
FIG. 4 illustrates a voxel mesh of a three-dimensional structure, in accordance with some embodiments of the present disclosure.

FIG. 4 illustrates a voxel mesh in accordance with some embodiments described herein. The voxel mesh illustrated in FIG. 4 represents a physical structure 70 in which material from a center of the structure has been removed (denoted as trench 72). Each unit cube corresponds to a voxel unit (e.g., voxel unit 74 in the trench 72). The trench 72 may be like the gate trench 22 in FIGS. 1B and 1C. A voxel unit 74 represents a volume containing the physical structure 70. Each voxel unit 74 is assigned with a material or a plurality of materials. For the trench 72 being a gate trench, voxel units at the bottom of the trench 72 may be assigned as a single material, such as silicon (i.e., substrate 12); voxel units at the sidewalls of the trench 72 may be assign as a combination of materials, such as a combination of Si, O, C as in SiOC (i.e., gate spacer 16). Each material in a voxel unit 74 is assigned a numeral representing its volume percentage in the respective voxel unit. The numeral is also referred to as volume fraction. For a single material, the volume fraction equals 1. For a combination of materials, each material has an assigned volume fraction less than 1, representing a fraction of the voxel unit volume occupied by this material. The volume fractions of the materials in the voxel unit add up to 1.

Also shown in FIG. 4 are newly added voxel units 76 after a topography simulation cycle. The added voxel units 76 represent volume added on the surfaces of the physical structure 70 due to surface reactions between incident particles and impacted voxel units 74. A volume of an added voxel unit 76 may equal a volume of the voxel unit 74, or multiple times of a volume of the voxel unit 74 (as illustrated in FIG. 4), or multiple fractions of the voxel unit 74. The volume of an added voxel unit 76 may be affected by an effective radius of the incident particle. The surface reaction and effective radius will be discussed in more details later on. The added voxel unit 76 is also assigned one or more material and respective volume fractions, as the added voxel unit 76 becomes part of the physical structure 70. The material(s) of the added voxel unit 76 and the volume fraction(s) are determined by a surface reaction model. The voxel unit 76 may includes a first material from the voxel unit 74 and a second material form the incident particle, if surface reactions occur.

The initialization of the voxel mesh may be performed by the CPU 32 (FIG. 2). The CPU 32 also generates a 3D voxel mesh data structure that stores the voxel mesh and stores it in the global memory and storage 36 for the HW accelerator

34 to retrieve in later operations. The 3D voxel mesh data structure is used both for storing and modifying structural information, and for calculating surface movement. The use of a single data structure that supports fast computation is essential for the robustness and speed of the topography simulator.

The voxel mesh may be adaptive. That is, the voxel units at different regions may have different volumes. For example, the voxel units inside the trench 72 may have a smaller volume than voxels away from the trench 72, such that the trench 72 have a more accurate representation. Additionally, voxel units at a larger depth from the surface of the structure may have a larger volume, as the need for resolution is generally loosen when it is distant away from the surface. In one embodiment, the whole structure is meshed by the CPU into voxel units, but only voxel units less than a threshold depth from the surface are stored in the global memory for process in simulations as an effort to reduce computational complexity. Further, voxel units do not have to all be cubes, but can have other shapes for different regions, such as some as cubes and some others as rectangular cuboids. Still further, based on the topography simulation in one iteration, an error-control algorithm based on a user specified error tolerance can adaptively adjust voxel mesh sizes to leverage simulation time with accuracy. Compared with FEM mesh that requires smooth surface conditions, voxel mesh allows the surface to be updated locally without restrictions of maintaining smoothness with respect to adjacent voxel units, which also speedups the simulation.

The method 50 at operation 54 (FIG. 3) generates a batch of particles from a particle source. The algorithm of generating the batch of particles may include a stochastic approximation random number generator. A Monte-Carlo particle emission model can be used to simulate the behavior of a particle source that emits particles that are, for example, used in an etching or deposition process. The Monte-Carlo particle emission model can simulate the effect of a particle source that emits multiple particles, each having a velocity vector (energy and flight angle), a location, and an effective radius. The effective radius describes a size of the particle, which is also a parameter suggesting how many voxel units would be affected by the particle. The effective radius may be normalized with respect to a size of the voxel unit. An effective radius that is equal to one suggests the particle may have surface reaction with one voxel unit hit by it. An effective radius that is larger than one suggests that the particle may have surface reaction with the voxel unit hit by it and also neighboring voxel units. An effective radius that is smaller than one suggests that the particle may have surface reaction with multiple fractions of the voxel unit hit by it but not a whole voxel unit. A particle may also be assigned with one or more materials with corresponding volume fractions, similar to the voxel units.

Particles in the batch are randomly selected based on a particle velocity probability distribution that characterizes the particle source. Low discrepancy and high-dimensional sampling algorithms (e.g. Latin Hyper-Cube Sampling, Sobol sequence) may be used to better represent the distribution of the particles emitted from the particle source. Based on the topography simulation in one iteration, an error-control algorithm based on a user specified error tolerance can adaptively adjust the number of particles generated by the Monte-Carlo particle emission model to leverage simulation time with accuracy. The generating of the batch of particles may be performed by the CPU 32 (FIG. 2) in some embodiments. Alternatively, the generating of the batch of particles may be performed by the HW accelerator 34 in some embodiments. The data structure describing generated particles with respective velocity vectors as initial conditions of the particles is stored in the global memory and storage 36 to be retrieved by the HW accelerator 34 later on for ray-tracing calculations in parallelism.

Figure 5:
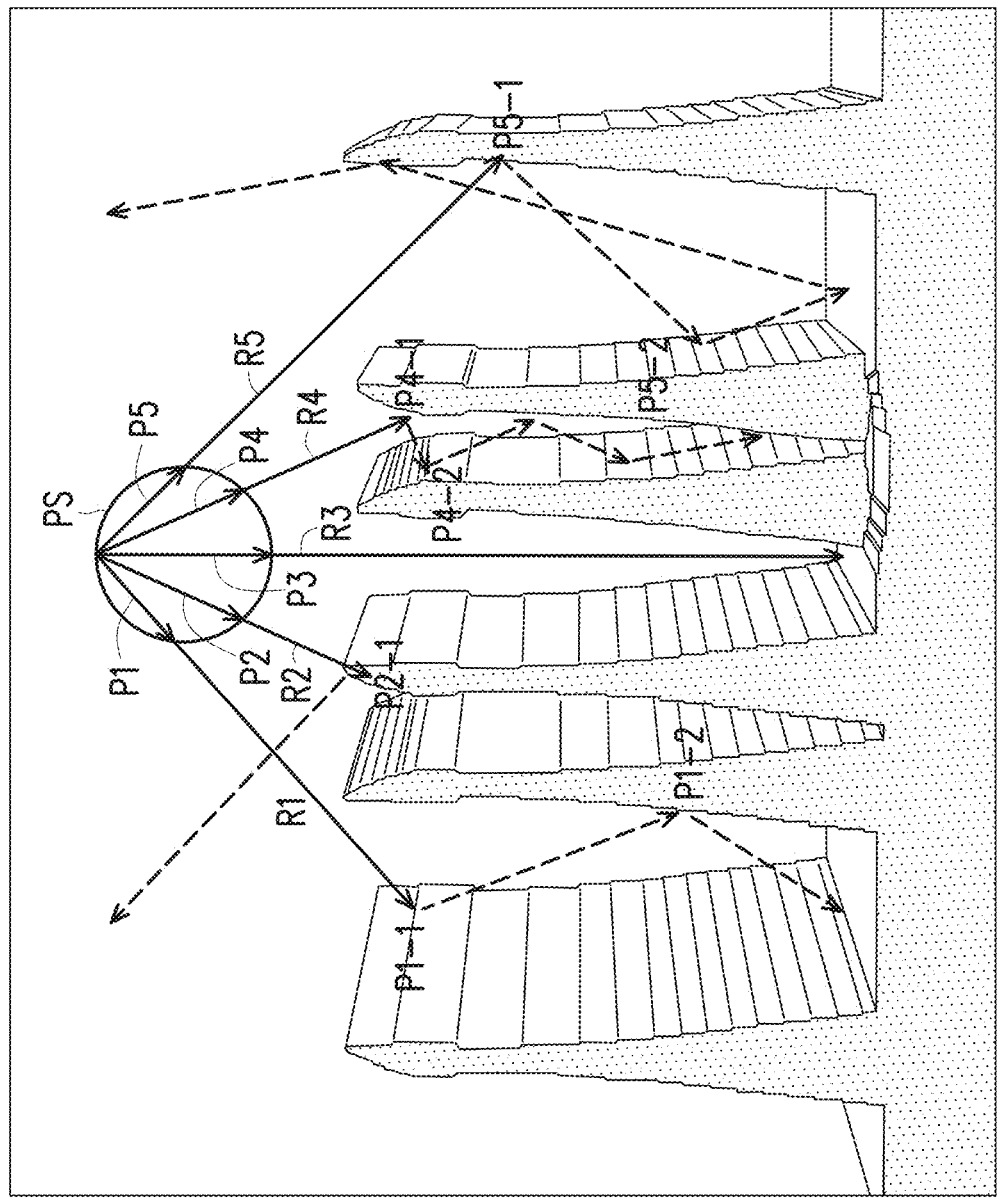
FIG. 5 illustrates a perspective view of a semiconductor device under an exemplary topography-changing process with a particle generating source, in accordance with some embodiments of the present disclosure.

In some embodiments, the Monte-Carlo particle emission model models a particle source that is used for deposition process in a semiconductor manufacturing process. FIG. 5 illustrates such a particle source, denoted as PS. Massive Monte-Carlo simulations are needed to mimic a realistic number of particles emitted from the particle source. FIG. 5 illustrated a small sample of such particles, denoted as $P_1$, $P_2$, $P_3$, $P_4$, and $P_5$. Each particle has an associated velocity vector (energy and flight angle), location, and effective radius. The Monte-Carlo particle emission model also mimics a realistic distribution of the energy and flight angle from the large amount of particles.

The method 50 at operation 56 (FIG. 3) assigns each particle (e.g., $P_1$, $P_2$, $P_3$, $P_4$, and $P_5$ in FIG. 5) to an available parallel processing thread in the hardware accelerator. In some embodiments, the amount of particles generated by the Monte-Carlo particle emission model at operation 54 is determined by the available amount of parallel processing threads in the hardware accelerator 34. For example, a HW accelerator 34 adopting Nvidia A100 GPU may provide 50 thousand parallel processing threads, and the Monte-Carlo particle emission model may generate the same number of particles at operation 54 to maximize the GPU computational power. Alternatively, each parallel processing thread may be assigned a sub-batch of particles. Inside the sub-batch, a particle's flight path is processed one after another by the same processing thread. In the above example, if each processing thread is assigned two particles to process, the Monte-Carlo particle emission model may generate a batch of total 100 thousand particles (50,000×2) in one batch. Other than relying on the CPU, which may only provide up to 64 processing threads, and particles other than the first 64 in the patch have to wait in a large queue to be processed, parallelization provided by the HW accelerator 36 dramatically shortens the processing time.

After each available processing thread in the HW accelerator 36 is assigned a particle (e.g., assigned from the CPU, if the CPU is used for generating the particles), the processing thread calculates the respective particle flight path as the particle's energy and angle are known by using ray-tracing method. Other than FDTD method that calculates all particles positions step-by-step at each time interval, the ray-tracing method allows flight path of each particle to be calculated independently without waiting for other particles' flight status to be updated. FIG. 5 illustrated the calculated flight paths of the particles $P_1$, $P_2$, $P_3$, $P_4$, and $P_5$, denoted as rays $R_1$, $R_2$, $R_3$, $R_4$, and $R_5$, respectively. The voxel unit that intersects a respective ray is also identified by each processing thread in the HW accelerator.

To predict surface reaction between the particle and the corresponding voxel unit that intersects the particle, surface normal at where the intersection occurs needs to be identified. Finding surface normal at the corresponding voxel can be time-consuming if assigned to a CPU. The method 50 at operation 58 (FIG. 3) relies on the parallel processing threads provided the HW accelerator 34 again to identify surface normal at each collision location. The parallel processing threads calculate the remaining energy of the particle, the incident angle, and the respective surface normal, and store the data to the global memory and storage 36 for the CPU 32 to retrieve. That is, the HW accelerator 34 collects information describing the moment the particle hits the voxel unit but pass the task of surface reaction prediction back to the CPU. This is because to predict surface reaction, a need for high prevision calculation outweighs a need for parallelization speedup.

The method 50 at operation 60 (FIG. 3) evaluates surface reactions at the locations of the voxel units reported from the HW accelerator 34. The evaluation of surface reactions is performed by the CPU 32. Evaluating surface reactions at the location on the surface of physical structure at the end portion of each flight path (e.g., rays R1-R5 in FIG. 5) determines whether the voxel unit is removed (etched), a new voxel is added (deposited) at the location on the surface of the physical structure because of the incident particle, or the voxel unit remains unchanged and the particle is reflected away. A surface reaction model may be used, taking inputs such as remaining energy and incident angel of the particle, surface normal of the voxel unit, material assigned to the voxel unit, material assigned to the particle, and the effective radius of the particle. Based on the effective radius suggesting how many voxel units may interact with the incident particle, the added voxel unit may have a volume of multiple existing voxel unit (or multiple voxel units added), a volume of multiple fractions of an existing voxel unit, or a volume equal to the existing voxel unit.

If a particle is not absorbed by the physical structure, it may be bounced off (reflected) from the surface of physical structure. The CPU 32 also identifies the particles reflected away based on the evaluated surface reaction and calculates the energy, flight angle, and current location of each reflected particle at the moment it is reflected away. As illustrated in FIG. 5, except that the particle $P_3$ is absorbed by the physical structure, other particles $P_1$, $P_2$, $P_4$ and $P_5$ are reflected away. The energy (velocity), flight angle, current location, and an updated effective radius of the particles $P_1$, $P_2$, $P_4$ and $P_5$ are stored as initial status of these particles in the next simulation iteration (to be explained in detail later on).

The method 50 at operation 62 (FIG. 3) updates the voxel mesh of the 3D structure of the semiconductor device based on the determined surface reactions (thus the surface movement) calculated by the CPU 32. Based on the surface reaction results, a voxel unit may be removed as a result of an etch or a new voxel may be added as a result of a deposition. A voxel unit may also remain unchanged if the surface reaction determines that no reaction has occurred. Material(s) and associated volume fraction(s) of impacted voxel units may also be updated. In some embodiments, a voxel unit may be partially removed or replaced by a new voxel unit with a smaller volume, which is to more accurately model the surface reaction if the particle can only affect a portion of the voxel unit. In some embodiments, the 3D structure of the semiconductor device is re-meshed with a new 3D voxel grid based on the determined surface reactions. Sometimes, a remeshing of the whole physical structure is needed such as when voxel units previously distant from the surface has become close to the surface with the progression of an etching and a finer (smaller voxel volume) meshing is required for the sake of accuracy. Updating voxel mesh of the 3D structure of the semiconductor device may be performed by the CPU 32 other than the HW accelerator 34. Reserving the right to modifying the 3D structure to the CPU 32 ensures the data structure is modified in a correct manner. Leaving the right to modifying the 3D structure to the HW accelerator 36 may lead to racing conditions among parallelization. Nonetheless, updating voxel mesh of the 3D structure of the semiconductor device may be performed by the HW accelerator 34 in some embodiments to accelerate simulation. In such a scenario, after the CPU 32 finishes evaluating surface reactions, it writes the surface movement results to the global memory, and the parallel processing threads in the HW accelerator 34 retrieve the surface movement results from the global memory and update the region corresponding to the particles assigned to the respective parallel processing threads.

At the conclusion of operation 62, if the simulation of the topography-changing process is finished, for example, when the trench 74 in FIG. 4 is filled up, the method 50 proceeds to operation 64 to smooth surfaces of the final 3D structure of the processed semiconductor device and generate output. One purpose of operation 64 is to suppress surface roughness due to the voxel mesh. As discussed above, not like FEM mesh that requires smoothness among adjacent cells, voxel mesh is less restricted and may introduce unphysical boundaries among adjacent voxel units. Smoothing methods can be used at this point by the CPU 32 to avoid unphysical surface roughness, as output structures need smoothing to be visualized as continuous edge curvature. The process can then check a termination condition to determine whether or not a user-defined termination condition has been satisfied. If the termination condition is satisfied, then the process can output the 3D voxel grid data structure to the storage, which can also be rendered to display the resulting topography of the processed semiconductor device on the display 40 (FIG. 2).

At the conclusion of operation 62, if the simulation of the topography-changing process is deemed unfinished, the method 50 loops back to operation 54 to generate a next batch of particles from the particle source. The reflected particles identified at operation 60 will be merged into the newly generated particles to form the next batch of particles. As illustrated in FIG. 5, particles $P_1$, $P_2$, $P_4$ and $P_5$ that have been stored will be treated as new particles $P_{1-1}$, $P_{2-1}$, $P_{4-1}$, and $P_{5-1}$ with their energy, flight angle, current location, and updated effective radius recorded after the reflection as new initial conditions. These particles will be merged with the new particles generated by the Monte-Carlo particle emission model into the new batch and reassigned to the parallel processing threads in the HW accelerator 34. Also as illustrated in FIG. 5, among particles $P_{1-1}$, $P_{2-1}$, $P_{4-1}$, and $P_{5-1}$, ray-tracing method determines that particle $P_{2-1}$ would be bounced away from the semiconductor device and thus be treated as being discarded in next iteration. While other particles $P_{1-1}$, $P_{4-1}$, and $P_{5-1}$ will be recorded as new particles $P_{1-2}$, $P_{4-2}$, and $P_{5-2}$ to be included in the next batch of particles for further simulation. In one example, when operation 54 is executed for the first time, 50 thousand particles are generated and ray-traced individually in the subsequent operations. After operation 62, 12 thousand particles are deemed reflected in the example. Thus, when operation 54 is executed for the second time, 38 thousand particles are newly generated and merged with the 12 thousand existing particles to form a new batch of 50 thousand particles to assign to the HW accelerator 34. The process continues until the simulation is deemed finished and the method 50 proceeds to operation 64 to smooth the surface of the finalized 3D structure and generate output.

The method 50 may proceed to further operations after the conclusion of operation 64, such as adjusting process setups or parameters (e.g, etchant concentration, flow rate, etch duration, pressure, temperature, etc. in an etch process) based on the topography simulation results.

Figure 6A:
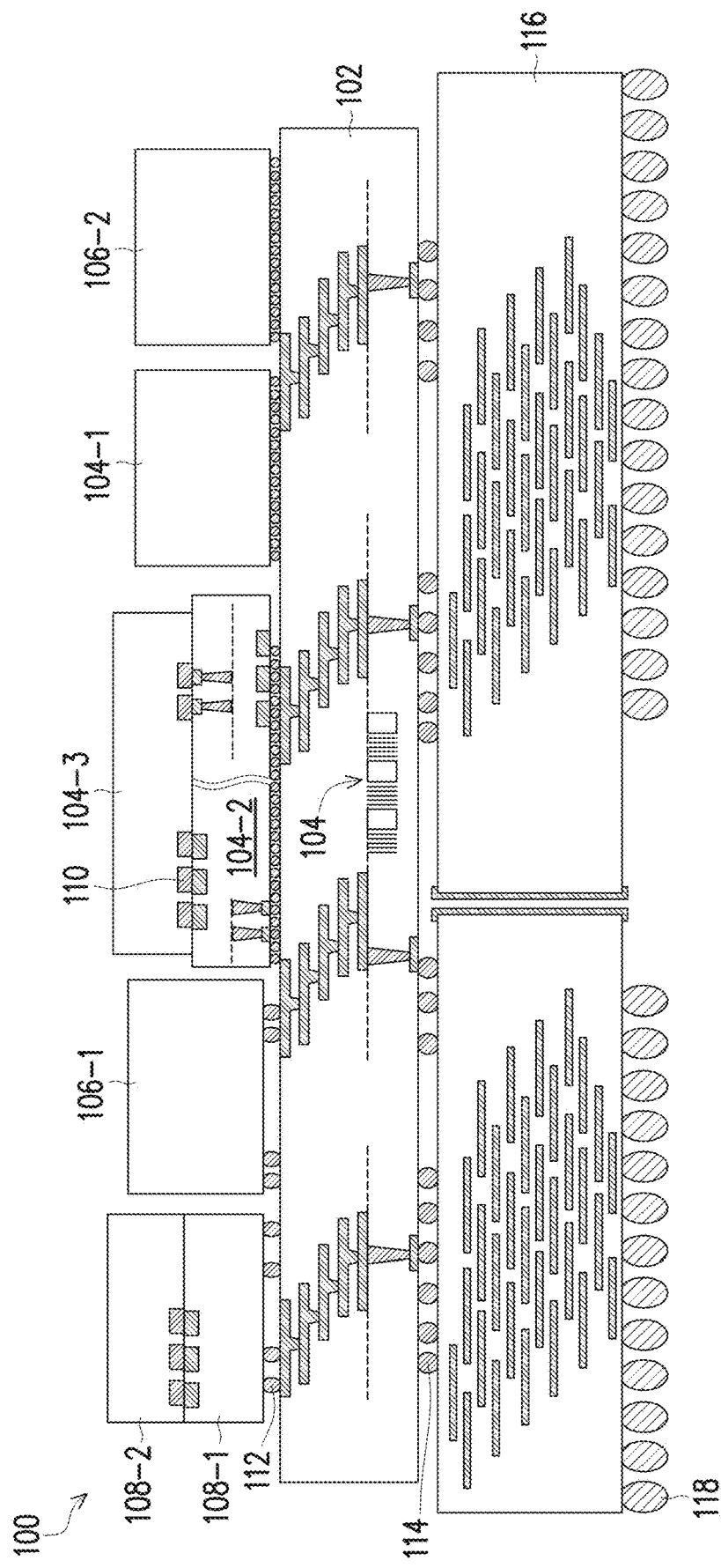
FIGS. 6A and 6B illustrate 3D package and 2.5D package implementations of a hardware platform for semiconductor topography simulations, in accordance with some embodiments of the present disclosure.
Figure 6B:
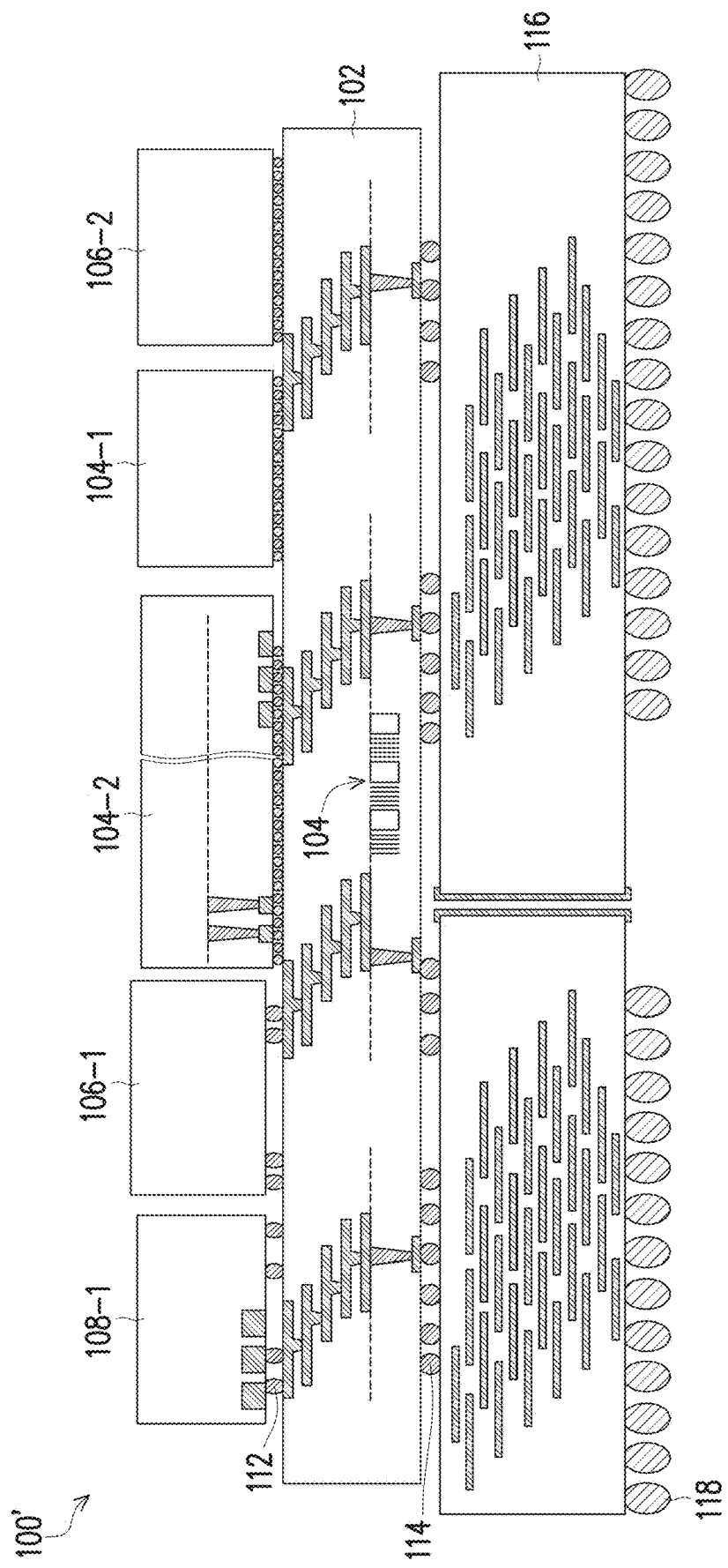

Reference is now made to FIGS. 6A and 6B. FIGS. 6A and 6B illustrates specialized hardware implementations 100 and 100', respectively, of the topography simulation system 30 in FIG. 2, in accordance with some embodiments described herein. The hardware implementations 100 and 100' are specialized by taking advantages of latest IC package techniques that support extreme high speed data transfer between CPU and hardware accelerators. Particularly, the hardware implementation 100 is a 3D IC module and the hardware implementation 100' is a 2.5D IC module, in each of which a plurality of packages (which include core device dies including CPU and HW accelerator as in System-on-Chip (SoC) packages) are incorporated into the same package, and are electrically connected to each other. In addition, the SoC packages, memory components (such as dies and/or memory cubes), and Independent Passive Device (IPDs) are bonded to a same package component such as an interposer, a laminated substrate, or the like. The interconnection between the SoC packages may include bridge dies, which are designed for high-density interconnections. Embodiments discussed herein are to provide examples to enable making or using the subject matter of this disclosure, such as the topography simulation system 30 as in FIG. 2, and a person having ordinary skill in the art will readily understand modifications that can be made while remaining within contemplated scopes of different embodiments.

The 3D IC module 100 in FIG. 6A includes an interposer 102. In accordance with some embodiments, the interposer 102 is a wafer. Alternatively, the interposer 102 may be formed of laminate substrate, cored or coreless package substrate, or the like, which may include organic dielectric materials, and Redistribution Lines (RDLs) formed in the organic dielectric materials. The organic material may be a polymer, which may include polyimide, polybenzoxazole (PBO), benzocyclobutene (BCB), or the like. The RDLs electrically connect the bond pads on the top surface of the interposer 102 to the bond pads on the bottom surface of the interposer 102, and electrically interconnect the bond pads on the top surface of the interposer 102. When the interposer 102 adopts the organic materials, the impedance of the RDLs in the interposer 102 may also be reduced. The interposer 102 may further includes deep-trench-capacitor 104 embedded therein. In an embodiment, the interposer 102 is a connection structure 102 including a plurality of conductive lines in one or a plurality of dielectric layers, in which the conductive line is a copper-containing layer, and the dielectric layer is a polymer material layer or an oxide-containing layer.

On the top surface of the interposer 102, the bonded package components include core-device-containing packages (such as System-on-Chip (SoC) packages) 104-1, 104-2, 104-3 (collectively as SoC packages 104), memory dies or memory packages (such as High-Bandwidth Memory (HBM) cubes or graphics double-data rate (GDDR) memory) 106-1, 106-2 (collectively as memory packages 106), I/O packages 108-1, 108-2 (collectively as I/O packages 108), and the like. In accordance with some embodiments, each of SoC packages 104 includes a single device die or a plurality of device dies bonded together to form a system. The device dies in SoC packages 104 may include core device dies such as CPU dies, GPU dies, TPU dies, FPGA dies, DSP dies, ASIC dies, FPGA dies, AI-accelerators, or the like, or combinations thereof. When a SoC package 104 includes a single device die, the device die includes multiple components on a same substrate, which components may include a CPU, memory, input/output ports and secondary storage. The single device die may also integrate digital, analog, mixed-signal, and sometimes radio frequency signal processing functions. The device dies in SoC packages 104 are not shown in detail. In the illustrated embodiment, SoC package 104-1 includes one or more CPU dies, each of the SoC packages 104-2 and 104-3 includes one or more GPU dies as part of the HW accelerator 34. Particularly, SoC package 104-3 is stacked above the SoC package 104-2 with bonding pads 110 and/or through-silicon-vias (TSVs) providing interconnections. In an embodiment, the bonding pads 110 of the SoC package 104-3 are bonded to the bonding pads of the SoC package 104-2, and a dielectric layer of the SoC package 104-3 are bonded to a dielectric layer of the SoC package 104-2. The bonding pad 100 is formed of copper or copper alloys. Similarly, each of the I/O packages 108 includes one or more I/O dies. The I/O package 108-2 is stacked above the I/O package 108-1 with bonding pads 110 and/or TSVs providing interconnections. In an embodiment, the bonding pads 110 of the I/O packages 108-1 are bonded to the bonding pads the I/O packages 108-2, and a dielectric layer of the I/O packages 108-1 are bonded to a dielectric layer of the I/O packages 108-2. The bonding pad 100 is formed of copper or copper alloys. The I/O dies may support infiniband (IB) networking. The memory packages 106 may include stacked memory dies such as Dynamic Random Access Memory (DRAM) dies, Static Random Access Memory (SRAM) dies, Magneto-resistive Random Access Memory (MRAM) dies, Resistive Random Access Memory (RRAM) dies, or other types of memory dies. Memory dies may be stacked, and encapsulant encapsulates memory dies therein to form the HBM cubes 106-1 and 106-2. The HBM cubes may provide a larger than 100G bit/second bandwidth.

SoC packages 104, HBM cubes 106, and I/O packages 108 may include metal bumps 112 at their bottom surfaces. Metal bumps 112 may be formed of copper, nickel, palladium, gold, composite layers thereof, and/or alloys thereof. The bonding may be achieved, for example, through solder bonding. In accordance with alternative embodiments, other types of bonding methods such as direct metal-to-metal bonding, hybrid bonding, or the like, may be used.

On the bottom surface of the interposer 102, metal bumps 114 connects the interposer 102 to package component 116. The package component 116 may be a package substrate (such as a coreless substrate or a substrate with a core), which includes electrical connectors 118 electrically connected to metal bumps 114 of the interposer 102 through the electrical paths inside the package component 116. Package component 116 may be of other types such as Printed Circuit Board (PCB). Package component 116 may include a second and a third interposer arranged side by side.

The 2.5D IC module 100' in FIG. 6B is similar to the 3D IC module 100 in many aspects. Reference numerals for similar components are repeated for the purpose of simplicity and clarity. Generally, in 2.5D package, there is no stacking of dies on dies, but dies are on the interposer 102. The dies are packed into a single package in a single plan and all may be flip-chipped on a silicon interposer. In 3D package, interposer and dies are stacked one above another. Dies interact among each other with TSVs. TSV is a high-performance interconnect made of a pillar-like structure with copper, tungsten or poly through silicon that provides electrical interconnects through a silicon die or through-wafer. As illustrated in FIGS. 6A and 6B, one difference between modules 100' and 100 is that there is no extra SoC package stacked on the SoC package 104-2 and there is no extra I/O package stacked on the I/O package 108-1.

The data structures and code described in the present disclosure can be partially or fully stored on a computer-readable storage medium and/or a hardware module and/or hardware apparatus. A computer-readable storage medium includes, but is not limited to, volatile memory, non-volatile memory, and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

Although not intended to be limiting, one or more embodiments of the present disclosure provide many benefits to a semiconductor device and the formation thereof. For example, embodiments of the present disclosure provide system and method to provide an EDA environment for improving accuracy and efficiency of semiconductor topography simulations. A simulation flow that consists of CPU and HW accelerator-based parallel processing threads speedups semiconductor surface topography simulations and reduces the time-to-market for ICs under development. Further, the simulation flow can be built-in software that comes with semiconductor manufacturing equipment (e.g., plasma-etch, PVD, CVD, or ALD reactor) or as standalone TCAD software patches.

In one exemplary aspect, the present disclosure is directed to a method for topography simulation of a physical structure under a topography-changing process. The method includes initializing a voxel mesh as a three-dimensional (3D) representation of the physical structure, generating a batch of particles, simulating a flight path of at least one of the particles with a ray-tracing method, identifying a voxel unit in the voxel mesh that intersects the flight path, determining a surface reaction between the one of the particles and the voxel unit, and adding an extra voxel unit adjacent to the voxel unit based on the determining of the surface reaction. In some embodiments, a volume of the extra voxel unit is larger than a volume of the voxel unit. In some embodiments, a volume of the extra voxel unit is a fraction of a volume of the voxel unit. In some embodiments, the voxel unit is assigned with a first material, the one of the particles is assigned with a second material, and the extra voxel unit is assigned with a composition including the first material and the second material. In some embodiments, the one of the particles is assigned with an effective radius, and the determining of the surface reaction includes considering neighboring voxel units of the voxel unit based on the effective radius. In some embodiments, the determining of the surface reaction is performed by a central processing unit (CPU), and the simulating of the flight path is performed by one of parallel processing threads in a hardware accelerator. In some embodiments, the CPU is coupled to the hardware accelerator through a global memory. In some embodiments, the adding of the extra voxel unit is reserved as a right exclusively to the CPU. In some embodiments, the generating of the batch of particles includes applying a Monte-Carlo particle emission model. In some embodiments, the applying of the Monte-Carlo particle emission model includes applying a Latin hyper-cube sampling or a Sobol sequence.

In another exemplary aspect, the present disclosure is directed to a method for performing a topography simulation on a hardware platform that includes a central processor and a hardware accelerator. The method includes retrieving from a memory device in the hardware platform an initial three-dimensional (3D) structure, meshing the initial 3D structure with a 3D voxel grid of voxel units, each of the voxel units being assigned at least a material and at least a volume fraction of the material, generating a plurality of particles from a particle source by the central processor, for each of the particles, and performing a set of operations to determine a topographical modification caused by the corresponding particle. The set of operations includes calculating a flight path by the hardware accelerator based on a ray-tracing method, and evaluating a surface reaction between the corresponding particle and an impacted voxel unit by the central processor. The method further includes updating the material and the volume fraction of the impacted voxel unit based on the evaluated surface reaction. In some embodiments, the hardware accelerator is a cluster of graphics processing units (GPU). In some embodiments, the set of operations further includes identifying a surface normal of the impacted voxel unit prior to the evaluating of the surface reaction. In some embodiments, the 3D voxel grid includes voxel units of different sizes. In some embodiments, the method further includes adding an extra voxel unit next to the impacted voxel unit, the extra voxel unit having a volume different from the impacted voxel unit. In some embodiments, the corresponding particle is assigned with a parameter indicating an effective radius of the corresponding particle. In some embodiments, in the hardware platform, the central processor, the hardware accelerator, and the memory device are carried by a same interposer.

In yet another exemplary aspect, the present disclosure is directed to a non-transitory computer-readable storage medium storing instructions and causing an executed computer to perform a method for topography simulating a non-removal type process on a physical structure. The method includes initializing a three-dimensional (3D) voxel grid that represents the physical structure, generating a batch of particles by a random number generator, ray tracing each of the particles in a plurality of parallel processing threads of the computer, evaluating reactions between the particles and the 3D voxel grid, and adding voxel units to the 3D voxel grid based on the evaluated reactions. In some embodiments, during the generating of the batch, a number of the particles equals a number of the parallel processing threads. In some embodiments, the added voxel units are assigned with one or more materials with corresponding volume fractions.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method for topography simulation of a physical structure under a topography-changing process, comprising:
   initializing a voxel mesh as a three-dimensional (3D) representation of the physical structure by a central processing unit (CPU);
   generating a batch of particles;
   simulating a flight path of at least one of the particles with a ray-tracing method by a graphics processing unit (GPU);
   identifying a voxel unit in the voxel mesh that intersects the flight path and a surface normal of the voxel unit by the GPU;
   passing information describing a moment the one of the particles hitting the voxel unit from the GPU to the CPU;
   determining a surface reaction between the one of the particles and the voxel unit by the CPU; and
   adding an extra voxel unit adjacent to the voxel unit based on the determining of the surface reaction.

2. The method of claim 1, wherein a volume of the extra voxel unit is larger than a volume of the voxel unit.

3. The method of claim 1, wherein a volume of the extra voxel unit is a fraction of a volume of the voxel unit.

4. The method of claim 1, wherein the voxel unit is assigned with a first material, the one of the particles is assigned with a second material, and the extra voxel unit is assigned with a composition including the first material and the second material.

5. The method of claim 1, wherein the one of the particles is assigned with an effective radius, and wherein the determining of the surface reaction includes considering neighboring voxel units of the voxel unit based on the effective radius.

6. The method of claim 1, wherein the generating of the batch of particles is performed by the CPU, and wherein the simulating of the flight path is performed by one of parallel processing threads in the GPU.

7. The method of claim 6, wherein the CPU is coupled to the GPU through a global memory.

8. The method of claim 6, wherein the adding of the extra voxel unit is reserved as a right exclusively to the CPU.

9. The method of claim 1, wherein the generating of the batch of particles includes applying a Monte-Carlo particle emission model.

10. The method of claim 9, wherein the applying of the Monte-Carlo particle emission model includes applying a Latin hyper-cube sampling or a Sobol sequence.

11. A method for performing a topography simulation on a hardware platform that includes a central processing unit (CPU) and a graphics processing unit (GPU), the method comprising:
    retrieving from a memory device in the hardware platform an initial three-dimensional (3D) structure;
    meshing the initial 3D structure with a 3D voxel grid of voxel units, wherein each of the voxel units is assigned at least a material and at least a volume fraction of the material;
    generating a plurality of particles from a particle source by the CPU;
    for each of the particles, performing a set of operations to determine a topographical modification caused by the corresponding particle, wherein the set of operations comprises:
       calculating a flight path by the GPU based on a ray-tracing method;
       identifying a surface normal of an impacted voxel unit in the 3D voxel grid that intersects the flight path by the GPU;
       passing information describing a moment of the corresponding particle hitting the impacted voxel unit from the GPU to the CPU; and
       evaluating a surface reaction between the corresponding particle and the impacted voxel unit by the CPU; and
    updating the material and the volume fraction of the impacted voxel unit based on the evaluated surface reaction.

12. The method of claim 11, wherein the GPU is coupled to the CPU through a global memory.

13. The method of claim 11, the identifying the surface normal of the impacted voxel unit is prior to the evaluating of the surface reaction.

14. The method of claim 11, wherein the 3D voxel grid includes voxel units of different sizes.

15. The method of claim 11, further comprising: adding an extra voxel unit next to the impacted voxel unit, wherein the extra voxel unit has a volume different from the impacted voxel unit.

16. The method of claim 11, wherein the corresponding particle is assigned with a parameter indicating an effective radius of the corresponding particle.

17. The method of claim 11, wherein in the hardware platform, the CPU, the GPU, and the memory device are carried by a same interposer.

18. A non-transitory computer-readable storage medium storing instructions and causing an executed computer to perform a method for topography simulating a non-removal type process on a physical structure, the method comprising:
    initializing a three-dimensional (3D) voxel grid that represents the physical structure;
    generating a batch of particles by a random number generator executed in a central processing unit (CPU) of the computer;
    ray tracing each of the particles in a plurality of parallel processing threads in a graphics processing unit (GPU) of the computer;
    identifying surface normals of a plurality of voxel units in the 3D voxel grid that intersect the particles by the parallel processing threads in the GPU;
    passing information describing moments the particles being intersected by the voxel units in the 3D voxel grid from the GPU to the CPU;
    evaluating reactions between the particles and the voxel units in the 3D voxel grid by the CPU; and
    adding extra voxel units to the 3D voxel grid based on the evaluated reactions.

19. The non-transitory computer-readable storage medium of claim 18, wherein during the generating of the batch, a number of the particles equals a number of the parallel processing threads.

20. The non-transitory computer-readable storage medium of claim 18, wherein the added extra voxel units are assigned with one or more materials with corresponding volume fractions.

* * * * *